United States Patent [19]

Kataoka

[11] Patent Number: 5,268,713

[45] Date of Patent: Dec. 7, 1993

[54] LENS-FITTED PHOTOGRAPHIC FILM UNIT

[75] Inventor: Hideaki Kataoka, Kanagawa, Japan

[73] Assignee: Fuji Photo Film Co., Ltd., Kanagawa, Japan

[21] Appl. No.: 939,738

[22] Filed: Sep. 2, 1992

[30] Foreign Application Priority Data

Sep. 3, 1991 [JP] Japan .................. 3-78792(U)

[51] Int. Cl.⁵ .................................................. G03B 17/02
[52] U.S. Cl. ................................... 354/288; 354/275; 354/174; 354/76
[58] Field of Search ............ 354/288, 275, 174, 76

[56] References Cited

U.S. PATENT DOCUMENTS 4,482,232  11/1984  Engelsmann et al. ............... 354/275
5,202,713   4/1993  Nakai et al. ........................ 354/288

*Primary Examiner*—Monroe H. Hayes
*Attorney, Agent, or Firm*—Sughrue, Mion, Zinn, Macpeak & Seas

[57] ABSTRACT

A lens-fitted photographic film unit is pre-loaded with an unexposed photographic film. An exposure station is adapted to exposing the film. A film supplying chamber contains a roll of the unexposed film with a first film end wound internally. A film take-up chamber is disposed opposite to the film supply chamber, and rotatably contains a spool for holding a second film end. The film as exposed is wound up in the film take-up chamber on the spool, having passed through a chamber entrance to the film take-up chamber. An outlet slot is formed behind the film take-up chamber. After completing winding-up of the film, the first film end is exited outward from the outlet slot when the spool is rotated. A tongue of a blocking member is movable so that the chamber entrance is left open when the spool rotates in the winding-up direction, and is partly closed when the spool rotates in the unwinding direction.

31 Claims, 6 Drawing Sheets

LENS-FITTED PHOTOGRAPHIC FILM UNIT

BACKGROUND OF THE INVENTION

1. Field of the Invention

The present invention relates to a lens-fitted photographic film unit, and more particularly to an improvement of a film unit in which a photographic film is pre-loaded without utilizing a film cassette.

2. Description of the Related Art

Lens-fitted photographic film units (hereinafter referred to as "film units") are currently on the market, e.g., under the trademark "Quick Snap" (manufactured by Fuji Photo Film Co., Ltd.). Such film units are a single-use camera pre-loaded with photographic film. These film units make it possible to take pictures whenever desired without the need for purchasing or carrying an expensive and heavy camera. The film unit in its entirety is forwarded to a photo laboratory after all frames on a photographic filmstrip (referred to as "film" herein) have been exposed. An operator at the laboratory unloads a cassette containing the exposed film from the film unit and subjects it to development and printing in accordance with conventional photographic processing techniques. The user receives photoprints and the negative film, but the film housing of the film unit is not returned. Such a film unit can take pictures of a reasonable quality in spite of its low cost.

The above type of film unit contains a film cassette, which is, however, disadvantageous in that the film housing must be disassembled or broken, at least partly, before unloading the cassette. Therefore, the efficiency of the developing process is lowered. As suggested in U.S. application Ser. No. 07/717,344, the present applicant has proposed an improved film unit containing the photographic film without the use of a cassette and provided with a structure by which the film as exposed can be easily removed from the film unit.

Such a film unit has a main body in which a lens, a film wind-up wheel, and a shutter mechanism are incorporated. The main body is provided with a film supplying chamber and a film take-up chamber formed on opposite horizontal sides of an exposure station. The unexposed film is in the form of a roll, with a trailing end thereof contained in the film supplying chamber and a leading end anchored on a spool disposed in the film take-up chamber. A user who uses the film unit operates the film wind-up wheel and winds up the film, frame by frame, after each exposure onto the spool contained in the film take-up chamber. After all the frames have been exposed, the full strip of the film is wound up in the film take-up chamber up to the trailing end of the film. When the exposed film is to be removed from the film housing, the spool is rotated in the unwinding direction, or in reverse. During the reverse rotation, the trailing film end is directed to an outlet slot formed on the body of the unit and exits therethrough. The cassetteless film unit is advantageous in that it allows for efficient handling in photo laboratories and a reduction in waste products.

There is, however, a problem in the above-mentioned cassetteless film unit. In particular, the trailing film end must be directed to the outlet slot before it can exit outward therefrom. The inside of the film take-up chamber is provided with a guide structure which directs the first film end toward the outlet slot in accordance with the reverse rotation of the spool. However, occasionally the guide structure fails to guide the trailing film end. Further rotation of the spool in the reverse direction sometimes causes the guide structure to properly guide the trailing film end. However, at times the trailing film end is caused to return toward the exposure station by entering a chamber entrance defined in the upstream position of the film take-up chamber. If the trailing film end returns towards the exposure station, it might get caught in the exposure station or stuck on a sprocket unit it jams. In such a case, considerable damage can be imparted to the film. Also, when such a malfunction occurs, the outlet structure for exiting the film is of no use and the film housing must be disassembled or broken in a darkroom, which is an extremely laborious manual operation.

SUMMARY OF THE INVENTION

In view of the foregoing problems, an object of the present invention is to provide a lens-fitted film unit in which the film can be easily removed after exposure.

Another object of the present invention is to provide a lens-fitted film unit in which photographic film as exposed can be reliably directed to the outside of the film unit by an external operation.

In order to achieve the above and other objects and advantages of this invention, a lens-fitted photographic film unit is pre-loaded with unexposed photographic film. An exposure station is adapted to exposing the film. A film supplying chamber is disposed beside the exposure station for containing the unexposed film wound in a roll with a first film end wound internally in the roll. A film take-up chamber is disposed on a side opposite to the film supplying chamber with respect to the exposure station. A spool is rotatably contained in the take-up chamber, and the exposed film is wound up inside the film take-up chamber, after passage through a chamber entrance thereof, when the spool is rotated in a winding direction. An outlet slot is formed in communication with the film take-up chamber for allowing the first film end to exit to an outside of the film unit when the spool is rotated in an unwinding direction, which is reverse to the winding direction, after winding the entire film in the film take-up chamber. Also, a device is provided for preventing the first film end from returning into the chamber entrance when the spool is rotated in the unwinding direction.

In a preferred embodiment, the return preventing device is a blocking member movable from an open position, wherein the entrance of the film take-up chamber is opened, to a closed position, wherein the entrance is at least partly obstructed. In the closed position, the blocking member stops the first film end, wound up in the film take-up chamber, from passing back through the chamber entrance.

The invention allows the photographic film to be reliably caused to exit to the outside of the film unit by an external operation after exposure. Accordingly, the film can be easily removed from the film unit and no laborious operation is necessary.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
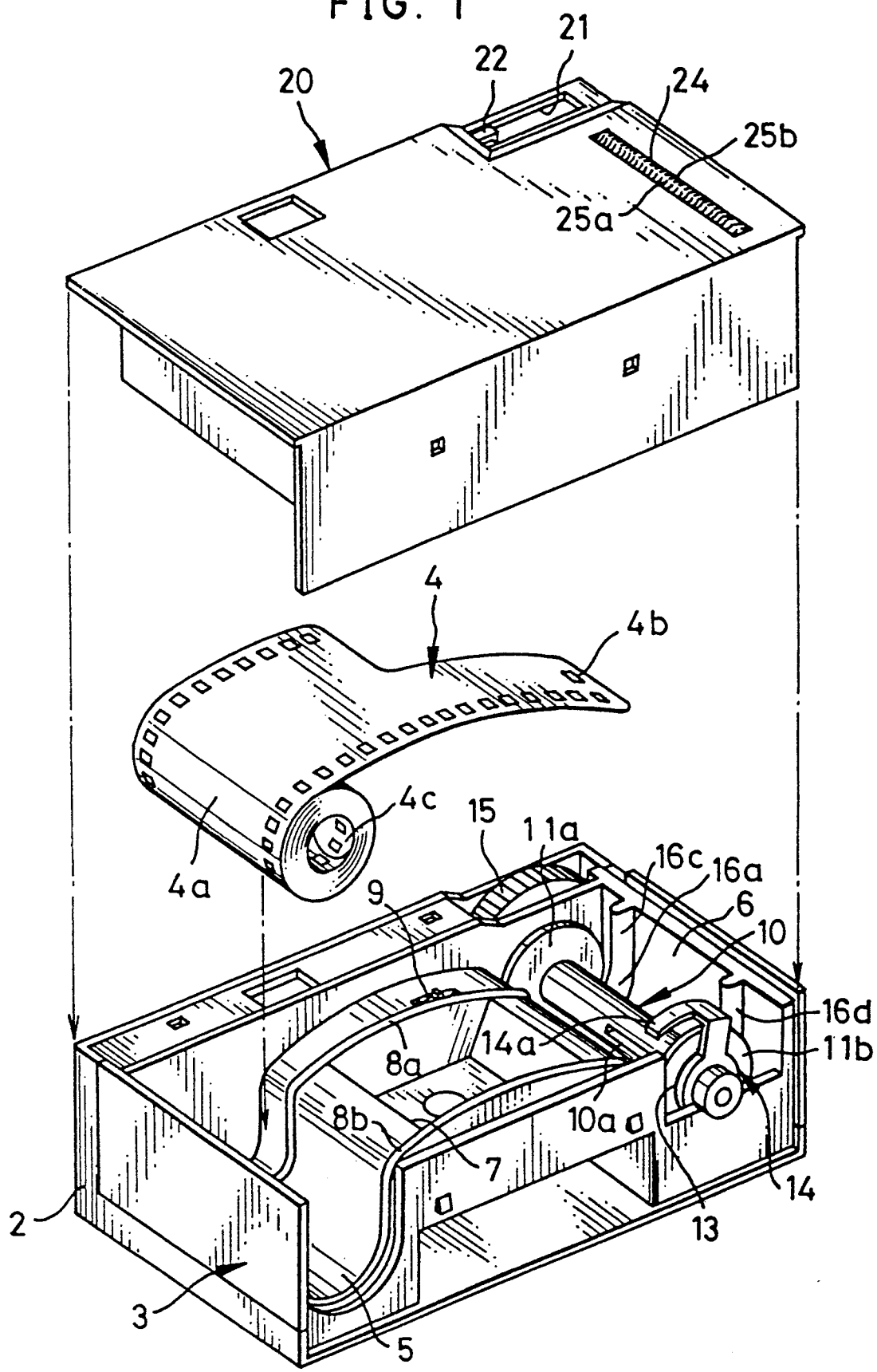
FIG. 1 is an exploded perspective view illustrating a lens-fitted photographic film unit according to a first preferred embodiment.
Figure 2:
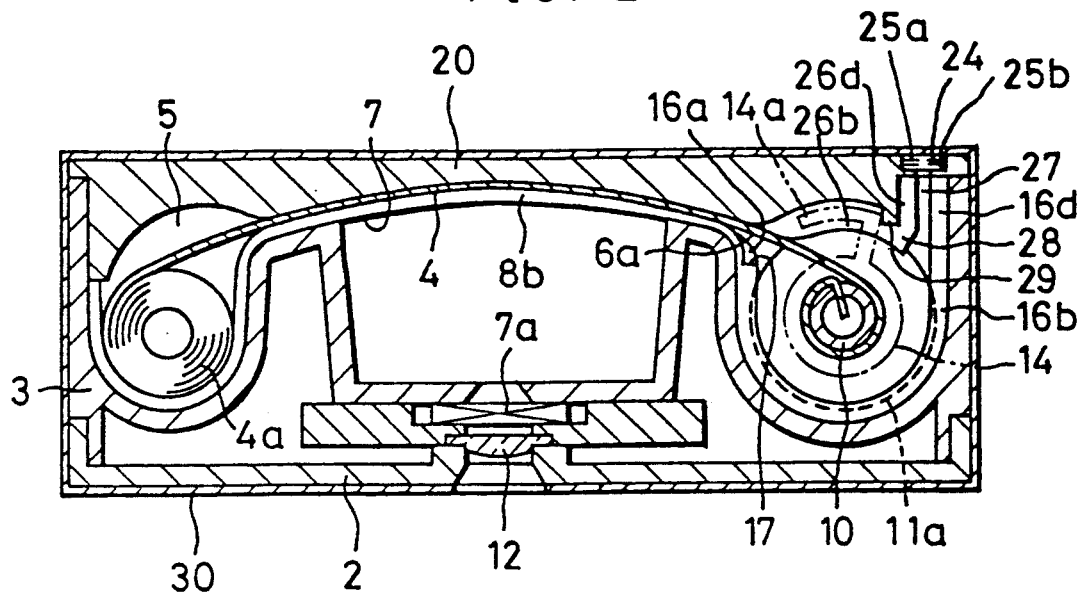
FIG. 2 is a horizontal sectional view of the film unit of FIG. 1.

FIGS. 1 and 2 illustrate a cassetteless lens-fitted photographic film unit according to a first embodiment of the invention. A film housing of the film unit is packed in a cardboard pack or carton 30, and is constituted of a front cover 2, a main body 3, and a rear cover 20. The main body has a film supplying chamber 5 and a film take-up chamber 6 defined therein. The film supplying chamber 5 is adapted to containing an unexposed roll 4a of a photographic filmstrip 4 (referred to as "film" herein), with a first film end 4c being wound internally in the roll 4a. An exposure station 7 is formed in the middle of the main body 3, between the film supplying chamber 5 and the film wind-up chamber 6, for defining an area on the film 4 to be exposed. A pair of rails, or ridges, 8a and 8b are formed along the upper and lower sides of the exposure station 7 so as to come into contact with edges of portions of the film 4 which are positioned on the exposure station 7. The rails 8a and 8b extend from the film supplying chamber 5 to the film take-up chamber 6 so as to reduce frictional resistance between the main body 3 and the film 4 by minimizing the area of contact of the film 4. When the film 4 is transported, a free sprocket 9 is rotated in meshing engagement with perforations in the film 4 so as to allow for counting of a created frame on the film during transportation of film 4 and for cocking a shutter 7a by a transmission device (not shown). Lens 12 is disposed in opposition to exposure station 7.

A rotatable spool 10 is disposed in the film supplying chamber 6 and has a slot 10a in which a second film end of the film 4 is anchored by engagement between a hole 4b, formed on the leader of film 4, and a claw formed in the slot 10a. Upper and lower flanges 11a and 11b are integrally formed with the spool 10 so as to cause each turn of the film 4 to be wound directly on top of a previous turn when the film 4 is wound up around the spool 10. A frictional ring 13 and a blocking member 14 are disposed on the spool 10 below the lower flange 11b. The ring 13 transmits rotation of the flange 11b to the blocking member 14, which is thus rotated in the direction of rotation of the spool 10. The blocking member 14 extends upward from the lower flange 11b, and has a tongue 14a formed thereon so as to project toward an estuary or chamber entrance 6a of the film take-up chamber 6. The upper end of the spool 10 is engaged with a fork (not shown) formed on the downside of a film wind-up wheel 15, which is located at the top of the film unit and is manually operated to rotate the spool 10 so as to wind the film 4 onto the spool 10.

A pair of arcuate ridges 16a and 16b are formed on the inside of the film take-up chamber 6. The ridges 16a and 16b are situated between the flanges 11a and 11b, and project toward a core of the spool 10 partly into an imaginary cylinder defined by the periphery of the flanges 11a and 11b. After completing winding-up of the film 4 into the film take-up chamber 6, the ridges 16a and 16b are in contact with the outermost turn of an exposed roll 4d of the film 4, wound on spool 10, to prevent the exposed roll 4d from loosening around the spool 10. The ridges 16a and 16b are connected to the rails 8a and 8b, respectively, at the entrance 6a. A recess 17 is formed near a side of the entrance 6a. The recess 17 is above the lower flange 11b and below the ridge 16b and the rail 8b in relation to the bottom of the film unit.

The rear cover 20 is attached to the main body 3 after the unexposed roll 4a of the film 4 is placed in the film supplying chamber 5 and the second film end is anchored on the spool 10. The rear cover 20 constitutes rear walls of the film supplying chamber 5 and the film take-up chamber 6, as illustrated in FIG. 2, and prevents light from falling on the rear of the film 4. A slot 21 is formed in the rear cover 20 for exposing a portion of the wind-up wheel 15 to the outside. A reversion preventing claw 22 is formed beside the slot 21 integrally with the rear cover 20 so as to mesh with teeth on the wind-up wheel 15 in a ratcheting fashion. The claw 22 is adapted to allowing the wind-up wheel 15 to rotate in the winding direction (clock-wise, as viewed in FIG. 1, or from the bottom) and prevents it from rotating in the unwinding direction (counterclockwise). An outlet slot 24 is formed in the rear cover 20. The outlet slot 24 ha a length which is somewhat larger than the width of the film 4 and communicates with the film take-up chamber 6. A pair of light-trapping members or plush 25a and 25b, which are well known for utilization in photographic film cassettes, are attached to the inside of the outlet slot 24 in order to prevent light from entering the film take-up chamber 6 through the outlet slot 24.

A pair of arcuate ridges 26a and 26b are formed inside the rear cover 20 for preventing the exposed roll 4d from loosening in cooperation with the ridges 16a and 16b (26b is not shown). Ridges 26a and 26b are connected to passage ridges 26c and 26d (of which only the lower one 26d is shown), which are formed on the inside of a passageway 27 connecting the film take-up chamber 6 to the outlet slot 24. The passage ridges 26c and 26d are opposed to a pair of ridges 16c and 16d, which are extensions of the ridges 16a and 16b to the inside of the passageway 27 (see FIG. 3). A claw 28 is formed by tapering the corner defined between the ridges 26b and 26d for separating the first film end 4c from the exposed roll 4d when the spool is rotated in the unwinding direction. Beside the claw 28 is formed a stopper projection 29 on the rear cover 20 in order to stop the blocking member 14 from rotating further in the clockwise direction. After the rear cover 20 is attached to the main body 3 to assemble the film housing, it is covered with a carton or cardboard pack 30.

Figure 3:
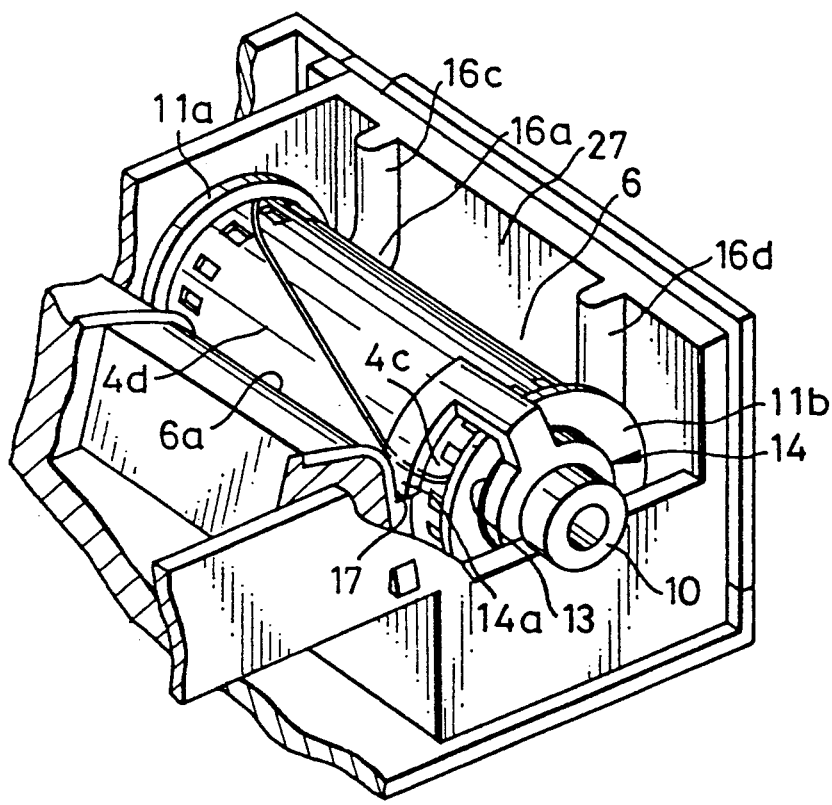
FIG. 3 is a perspective view, in partial section, illustrating part of the film take-up chamber of the first embodiment.
Figure 5:
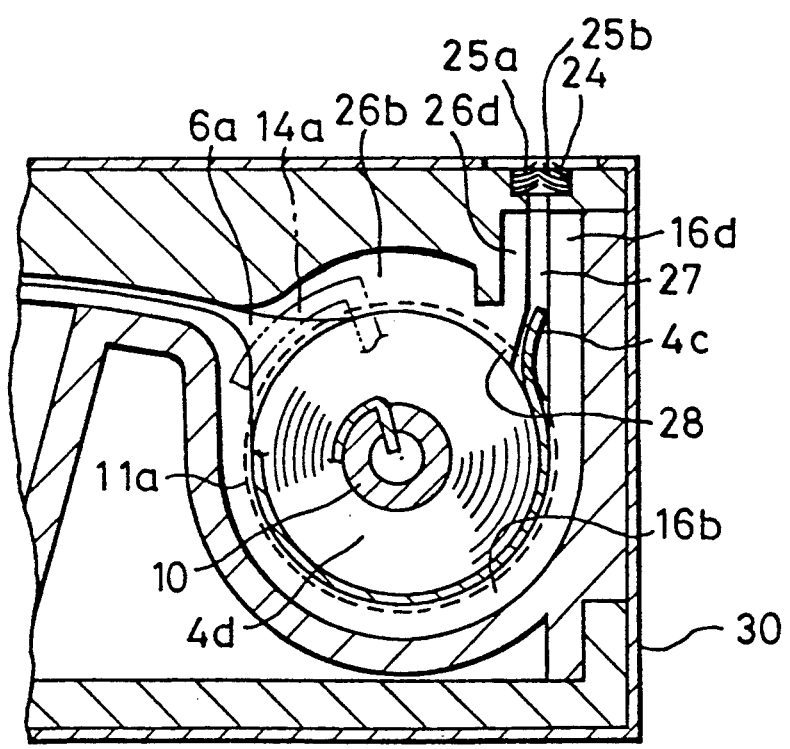
FIG. 5 is a horizontal sectional view illustrating part of the film take-up chamber of the first embodiment at the time when the first film end is about to exit therefrom.

Operation of the film is described below referring to FIGS. 3 and 5. With one respective frame of film 4 exposed, the wind-up wheel is rotated clockwise as viewed in FIG. 1 (or from the bottom of the unit). Clockwise rotation of the wheel 15, however, does not cause the blocking member 14 to rotate clockwise because the tongue 14a is brought into contact with the stopper 29 to prevent further rotation of the blocking member 14. Accordingly, during winding-up of the film 4, the spool 10 rotates clockwise without rotation of the blocking member 14. In each operation of winding-up of the film 4, a frame portion of the film 4, as exposed, is wound up, frame after frame, around the spool 10. After all the frames of the film 4 have been exposed, the wheel 15 is rotated clockwise. Accordingly, the film 4 is wound up, into exposed roll 4d, entirely in the film take-up chamber 6 up to the first film end 4c (see FIG. 3). The absence of film proximate the exposure station 7 causes a known counter mechanism to display an indication such as "All Frames Exposed" in a counter window. When the first film end 4c is wound up into the film take-up chamber 6, the exposed roll 4d of the film 4 has a maximum diameter around the spool 10 so that the ridges 16a and 16b are in contact with the outermost turn of the film 4.

Figure 4:
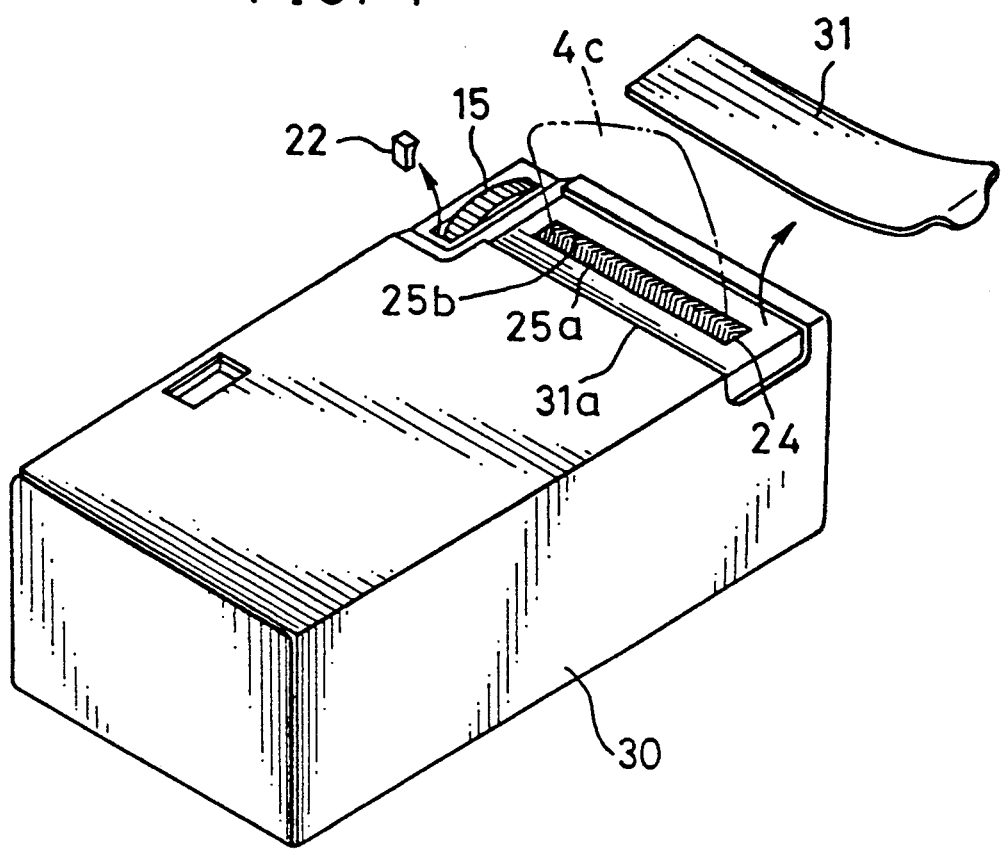
FIG. 4 is a perspective view illustrating a rear of the film unit of the first embodiment at the time when the film is about to be removed.

The entire film unit is then forwarded to a photo laboratory with film 4 still contained therein. An operator of the photo laboratory breaks the claw 22 away from the rear cover 20, as illustrated in FIG. 4, and tears away a tearable portion 31 of the cardboard pack 30 covering the outlet slot 24 by cutting it off along a perforation line 31a. Destruction of the claw 22 enables the wind-up wheel 15 to be rotated counterclockwise. Removal of the tearable portion 31 exposes the outlet slot 24 of the film housing.

The wind-up wheel 15 is then rotated counterclockwise so that the spool 10 rotates in the same direction. Rotation of the spool 10 is transmitted to the blocking member 14 via the flange 11b and the frictional ring 13. Accordingly, the tongue 14a is swung, in a counterclockwise direction, from the open position to the closed position, and brought into contact with the inside of the recess 17, as illustrated in FIG. 3. Recess 17 serves to keep the tongue 14a in the closed position, where the chamber entrance 6a is partly closed by the tongue 14a while spool 10 is rotated in the counterclockwise direction.

Although the counterclockwise rotation of the spool 10 would tend to loosen the film 4 around the spool 10, the exposed roll 4d of the film 4 is prevented from loosening by the ridges 16a and 16b cooperating with the ridges 26a and 26b, so that the film 4 is rotated counterclockwise in the unwinding direction together with the spool 10. The first film end 4c passes close to the entrance 6a during rotation of the roll 4d, but will never enter the entrance 6a because the entrance 6a is blocked by the tongue 14a. Note that the first film end 4c is cut slantwise so as to form a projected portion at a lower edge thereof. Accordingly, the partial closure of entrance 6a by the tongue 14a is sufficient because only the projected portion of the leading edge of the first film end 4c must be blocked.

While the spool 10 is rotated, the first film end 4c eventually comes close to an entrance to the passageway 27, where the first film end 4c is separated by the separator claw 28 from the exposed roll 4d. The first film end 4c is thus advanced through the passageway 27 by rotation of the exposed roll 4d so as to exit to the outside through the outlet slot 24 in the rear cover 20. With the first film end 4c partly projecting out of the outlet slot 24, the film housing is loaded in a holder section of a film processor, which performs treatments such as cutting the film end 4c and splicing the film 4 to a drawing sheet of the processor. The processor conducts a developing process after drawing the film 4 out of the film housing. The second film end is anchored on the spool 10. Therefore, when the film 4 is almost fully withdrawn, it is cut off along the outlet slot 24 in a position proximate the second film end.

Figure 6:
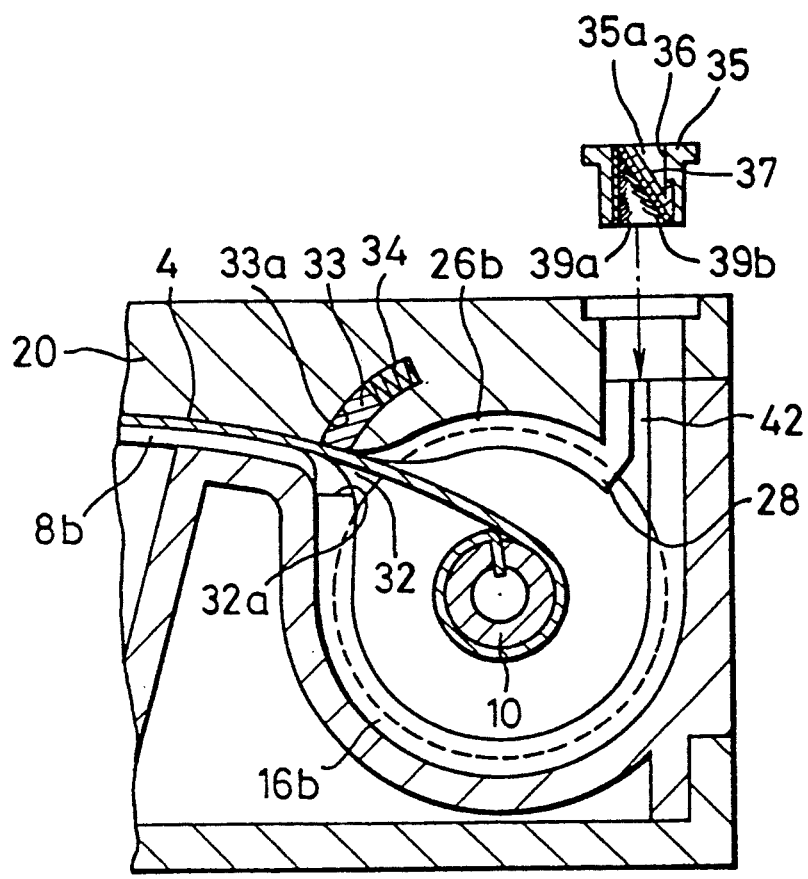
FIG. 6 is a horizontal sectional view illustrating a second preferred embodiment of the present invention.

FIG. 6 illustrates another preferred embodiment. In this embodiment, blocking pin 33, utilized instead of the blocking member 14, is slidably fitted in a hole 33a formed in the rear cover 20 proximate a chamber entrance 32 of the film take-up chamber 6. A coil spring 34, having a relatively small pressing force, is disposed behind the pin 33 and biases it toward the film 4. The pin 33 is kept in contact with the rear of the film 4 passing the entrance 32. The rail 8b supports the film 4 rearward until a position slightly upstream from the pin 33 so that the contact of the pin 33 with the rear of the film 4 does not influence the transportation of the film 4. With all frames exposed, the leader 4c is wound up into the film take-up chamber 6. Accordingly, the pin 33 is projected from the hole 33a, in response to the absence of the film 4 from the entrance 32, and is pressed against the inside of a receiving recess 32a, thus blocking the entrance 32. Even when the spool 10 is subsequently rotated counterclockwise, the first film end 4c will never pass through the entrance 32 because it is partly obstructed by the pin 32. Rotation of the spool 10, in a manner similar to the former embodiment, causes the first film end 4c to exit to the outside of the film housing.

The film 4 of the film unit of FIG. 6 exits through an outlet slot 36 formed in a separate outlet part 35, which is fitted on the rear cover 20. Through the outlet part 35 is formed a passageway 35a, via which the outlet slot 36 is communicated to a passageway 42 from the film take-up chamber 6. The passageway 35a is wider than the passageway 42. A thin spring plate 37, bent in a V-shape, is attached to one lateral wall of the passageway 35a, and a pair of plush members 39a and 39b are attached to a surface of the spring plate 37 and the opposite lateral wall of the passageway 35a, respectively. The bias of the spring plate 37 keeps the plush members 39a and 39b in contact with each other. This construction yields a better light-trapping capacity than a construction wherein plush is simply provided on lateral walls of the passageway 35a.

Figure 7:
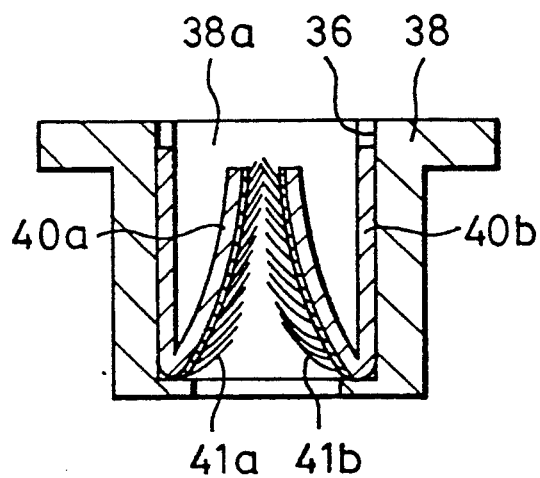
FIG. 7 is a horizontal sectional view illustrating an outlet part according to a third preferred embodiment.

FIG. 7 illustrates a third embodiment wherein an outlet part 38, in which a pair of spring plates 40a and 40b are attached to lateral walls of a passageway 38a, and a pair of plush members 41a and 41b, attached to the spring plates 40a and 40b, respectively, are pressed against each other. It is also possible to replace the spring plates 40a, 40b and the plush members 41a, 41b by a pair of flexible resinous sheets having a light-trapping characteristic. Such sheets also prevent light from entering the passageway 38a through the outlet slot 36.

Figure 8:
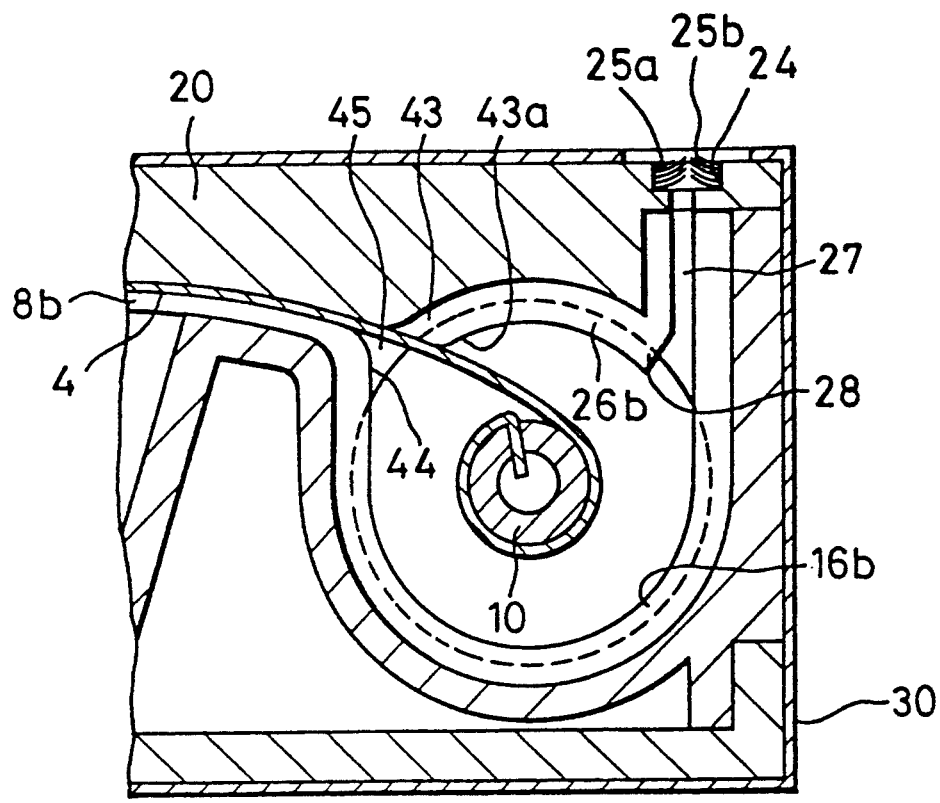
FIG. 8 is a horizontal sectional view illustrating a fourth preferred embodiment of the present invention.
Figure 9:
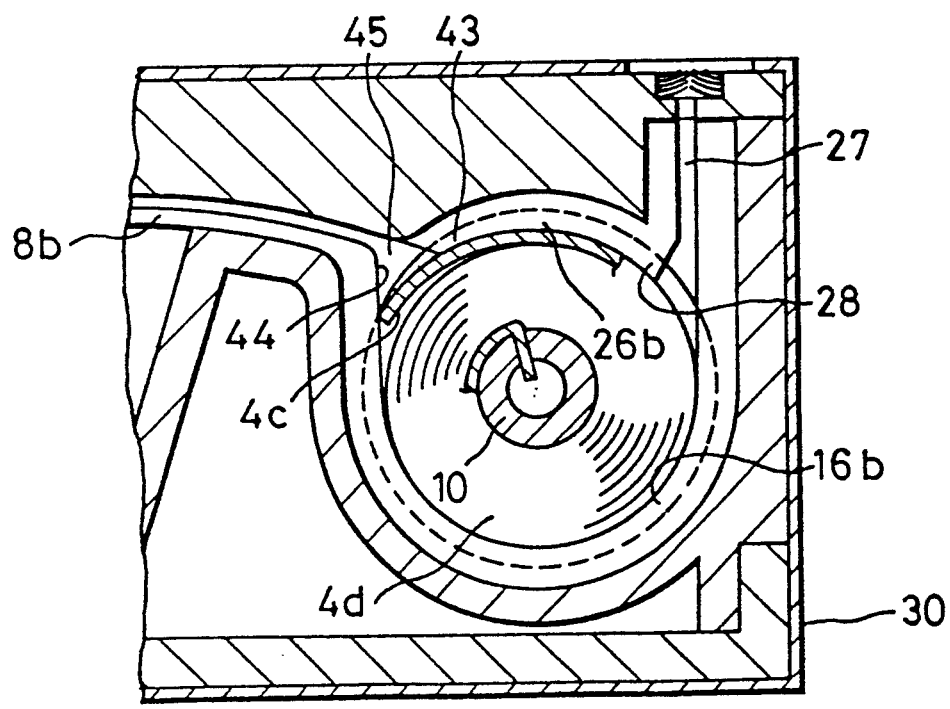
FIG. 9 is a horizontal sectional view illustrating the operation of the film unit of FIG. 8.

FIG. 8 illustrates a fourth preferred embodiment in which the first film end 4c is blocked at a chamber entrance 45 by means of a construction other than the movable blockage devices of the embodiments mentioned above. Elements similar to those of the former embodiments are designated with the same reference numerals. The ridge 26b on the rear cover 20 is provided with a guide portion 43 extending to the entrance 45. The ridge 16b on the main body 3 is provided with a guide portion 44 extending to the entrance 45. An arcuate surface 43a of the guide portion 43 is shaped to define an arc substantially lying on a circle defined by the outermost turn of the maximum roll 4d of the film 4, as shown in FIG. 9. The corner portion connecting the guide portion 44 to the rail 8b is situated in a position rearward from a linear extension of the arcuate surface 43a. Due to this construction, the first film end 4c is kept from entering the entrance 45, even during counter-clockwise rotation of the fully wound-up roll 4d, because the arcuate surface 43a guides the first film end 4c to a position on the guide portion 44 which is deviated forward from the entrance 45.

In order to cause the first film end 4c to exit through the outlet slot 24 by rotating a spool, a structure for reliably transmitting the rotation of the spool 10 to the roll 4d is required. To transmit this rotation, the above embodiments are provided with ridges 16a, 16b, 26a, and 26b, which prevents the exposed roll 4d from loosening in the film take-up chamber 6. These looseness-preventing ridges, however, can be replaced by various structures, as illustrated in FIGS. 10 and 11, for example, which illustrate fifth and sixth embodiments of the invention, respectively.

Figure 10:
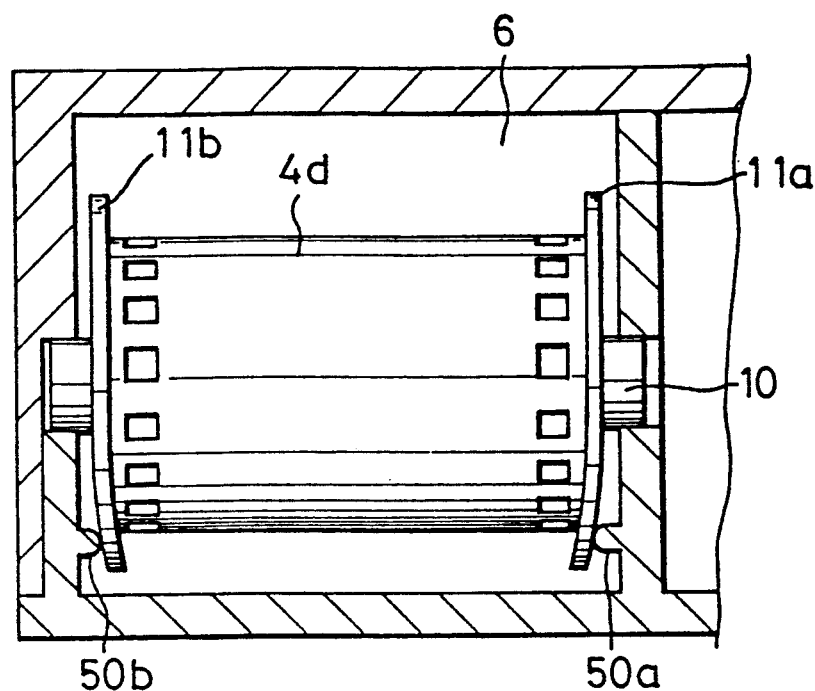
FIGS. 10 and 11 are cross-sectional views illustrating rotation-transmitting structures according to the fifth and sixth embodiments, respectively.

In FIG. 10, the flanges 11a and 11b are flexibly formed on the spool 10. Projections 50a and 50b are formed on the inside at film take-up chamber 6 so as to come into contact with flanges 11a and 11b to deform them inwardly. Deformation of the flanges 11a and 11b causes their inside surfaces to clamp the exposed roll 4d vertically (horizontally in FIG. 10) so that rotation of the spool 10 is transmitted to the exposed roll 4d via the flanges 11a and 11b. It is preferable to situate the projections 50a and 50b in opposition to the entrance of the film take-up chamber 6 with reference to the axis of the spool 10. The flanges 11a and 11b are not deformed at portions thereof proximate the entrance so that the longitudinal edges of the film 4 will never ride on the periphery of the flanges 11a and 11b during winding-up of the film 4 into the film take-up chamber 6. The flanges 11a and 11b are deformed at portions upstream from the passageway 27 so as to tightly clamp the outer turns of the exposed roll 4d. The projections 50a and 50b are thus advantageous in directing the first film end 4c to the passageway 27.

Figure 11:
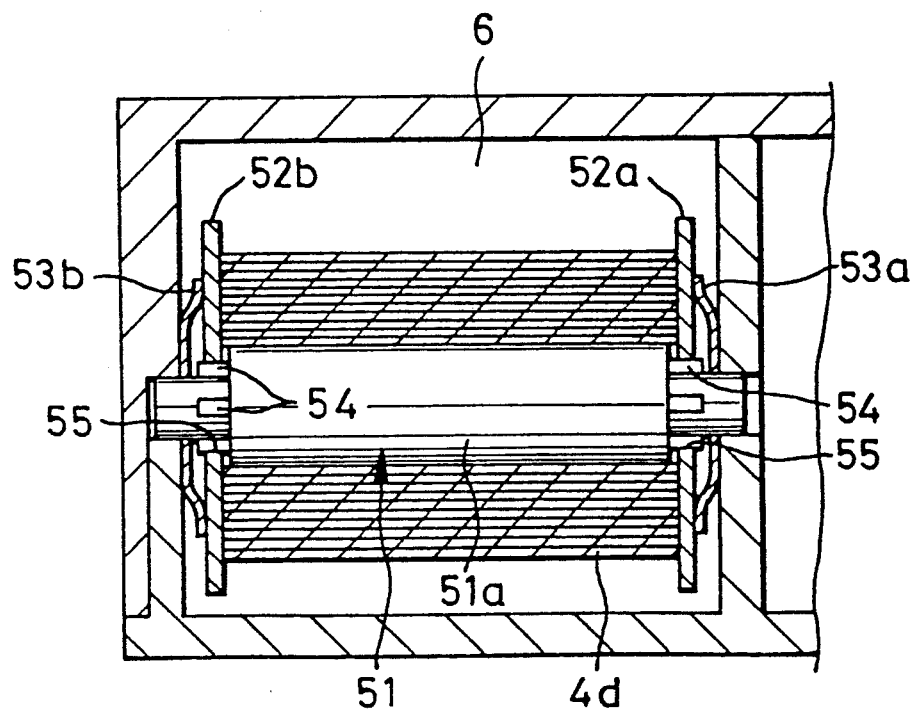

FIG. 11 illustrates a spool 51, which is constituted of a core 51a and a pair of flanges or disks 52a and 52b. The flanges 52a and 52b are fitted on the core 51a so as to be slidable in the axial direction, and are biased inwardly by spring washers 53a and 53b. Each end of the core 51a is provided with four projections 54, disposed in a rotationally symmetric manner. Projections 54 are fitted in respective recesses 55 formed in bearing holes of the flanges 52a and 52b. When the spool 51 is rotated, rotation is transmitted to the flanges 52a and 52b via the projections 54 and the recesses 55. The bias of the spring washers 53a and 53b causes the flanges 52a and 52b to clamp the exposed roll 4d. Accordingly, the rotation of the spool 51 causes the exposed roll 4d to rotate integrally with the spool 51.

It is noted that a pair of spreader projections may be formed inside the film take-up chamber 6, close to the entrance thereof, so as to come into contact with both flanges and spread the interval therebetween, thus releasing the exposed roll 4d from a clamped state at portions proximate the entrance of take-up chamber 6. The embodiment illustrated in FIGS. 10 and 11 may be additionally provided with the looseness-preventing ridges 16a, 16b, 26a, and 26b.

Although the present invention has been fully described by way of preferred embodiments thereof with reference to the accompanying drawings, various changes and modifications will be apparent to those of ordinary skill in the art. Therefore, unless otherwise these changes and modifications depart from the scope of the present invention, as defined by the appended claims, they should be construed as included therein.

What is claimed is:

1. A lens-fitted photographic film unit having an unexposed photographic film loaded therein, comprising:
   an exposure station at which said film is photographically exposed;
   a film supplying chamber disposed beside said exposure station which initially contains said film, before exposure, wound in the form of a roll, a film end being wound internally in said roll;
   a film take-up chamber disposed on a side of said exposure station which is opposite to said film supplying chamber;
   a spool rotatably contained in said take-up chamber, said film being wound up on said spool into an exposed roll, after said film has been exposed and passed through a chamber entrance defined in said film take-up chamber, when said spool is rotated in a first direction;
   said film take-up chamber having an outlet slot formed therein for allowing said film end to exit said take-up chamber to an outside of said film unit when said spool is rotated in a second direction, which is reverse to said first direction, after said film end has been wound up onto said exposed roll on said spool; and
   return preventing means for preventing said film end from returning into said chamber entrance when said spool is rotated in said second direction.

2. A lens-fitted photographic film unit as defined in claim 1, wherein a pair of light-trapping members are provided on inside surfaces of said outlet slot so as to prevent light from entering an inside of said film take-up chamber through said outlet slot.

3. A lens-fitted photographic film unit as defined in claim 2, further comprising:
   a shutter and a taking lens both disposed in front of said exposure station, and a film wind-up mechanism for rotating said spool so as to transport said film, frame by frame, from said supplying chamber to said exposure station and then to said take-up chamber so as to allow latent images to be photographically recorded on said film.

4. A lens-fitted photographic film unit as defined in claim 3, wherein said wind-up mechanism includes a wind-up wheel coupled directly to said spool, a portion of said wind-up wheel protruding from said film unit so as to be externally operable, said spool being rotated by rotating said wind-up wheel in said second direction when said film is exited from said take-up chamber.

5. A lens-fitted photographic film unit as defined in claim 4, further comprising:
   a reverse rotation preventing means for preventing said wind-up mechanism from rotating in said second direction, said reverse rotation preventing means being removable so as to allow said wind-up mechanism to be rotated in said second direction.

6. A lens-fitted photographic film unit as defined in claim 5, wherein said outlet slot is open to an outside of said film unit at a rear surface of said film unit.

7. A lens-fitted photographic film unit as defined in claim 6, wherein said return preventing means is a blocking member movable from an open position, wherein said entrance of said film take-up chamber is unobstructed, to a closed position, wherein said entrance is at least partly obstructed, said blocking member stops said film, wound up in said film take-up chamber, from passing through said entrance when said blocking member is in said closed position.

8. A lens-fitted photographic film unit as defined in claim 7, wherein said blocking member moves from said open position to said closed position in response to completion of winding said film, including said film end, into said film take-up chamber.

9. A lens-fitted photographic film unit as defined in claim 7, further comprising:
 a linkage coupled to said spool and said blocking member so as to cause said blocking member to move from said open position to said closed position when said spool is rotated in said second direction.

10. A lens-fitted photographic film unit as defined in claim 9, said blocking member comprising:
 a ring portion rotatably fitted on said spool;
 a radial member radially extending from said ring;
 a bridge portion extending from a distal end of said radial portion in a direction along a width of said film; and
 an arcuate tongue portion formed on a distal end of said bridge portion, said tongue portion being adapted to swinging between a closed position, wherein said tongue at least partially obstructs said entrance, and an open position, wherein said tongue is displaced away from said entrance in said first direction; and
 said linkage being a frictional ring disposed between said spool and said ring portion so as to be in frictional contact therewith in order to transmit rotation of said spool to said ring portion of said blocking member.

11. A lens-fitted photographic film unit as defined in claim 10, said spool comprising:
 a shaft; and
 a flange disposed proximate each end of said shaft, said exposed roll of said film being wound on said shaft between said flanges.

12. A lens-fitted photographic film unit as defined in claim 11, said ring portion being fitted on said spool at a position outside of one of said flanges, said bridge portion extending over an edge of said one flange.

13. A lens-fitted photographic film unit as defined in claim 10, further comprising:
 a recess formed proximate said entrance so as to receive a distal end of said tongue portion when said tongue portion is swung in said second direction into said closed position.

14. A lens-fitted photographic film unit as defined in claim 13, further comprising:
 a separator claw formed in said film take-up chamber so as to separate said film end from an outside of said exposed roll of said film and guide said film end to said outlet slot when said spool is rotated in said second direction.

15. A lens-fitted photographic film unit as defined in claim 14, further comprising:
 a pair of ridges formed on a cylindrical surface of said film take-up chamber so as to contact with said exposed roll of said film wound on said spool in order to prevent said roll from loosening, said ridges causing rotation of said spool be transmitted to said exposed roll, whereby a front edge of said film end abuts upon said separator claw during rotation of said spool in said second direction.

16. A lens-fitted photographic film unit as defined in claim 15, further comprising:
 a stopper projection formed on a rear of said film take-up chamber so as to abut against a proximal end of said tongue portion when said tongue portion is swung in said first direction to said open position.

17. A lens-fitted photographic film unit as defined in claim 16, further comprising:
 a cardboard pack surrounding a body of said unit;
 said cardboard pack having a perforation line formed thereon around a portion thereof which covers said outlet slot, said outlet slot being exposed to an outside when said cardboard pack is torn along said perforation line.

18. A lens-fitted photographic film unit as defined in claim 17, wherein said tongue portion and said recess are situated in correspondence with a position slightly inward from perforations formed in edges of said film, said film end having a front edge which is cut slantwise in such a shape as to project on a side corresponding to said tongue portion.

19. A lens-fitted photographic film unit as defined in claim 8, wherein a hole is formed in a rear wall of said entrance, said blocking member being slidably received in said hole, a spring being disposed between said blocking member and a bottom portion of said receiving hole so as to bias said blocking member toward said closed position, said blocking member being pressed by said film into said open position when a portion of said film is in said entrance.

20. A lens-fitted photographic film unit as defined in claim 19, wherein a recess is formed proximate said entrance so as to receive a distal end of said blocking member when said blocking member is in said closed position.

21. A lens-fitted photographic film unit as defined in claim 20, further comprising:
 an outlet member in which said outlet slot is formed, said outlet member being fitted on said film unit and having a first passageway which extends through said outlet member, said first passageway being communicated with a second passageway which extends from said film take-up chamber, said first passageway being wider than said second passageway in order to support said light-trapping members therein.

22. A lens-fitted photographic film unit as defined in claim 21, further comprising:
 a pair of V-shaped spring members attached to inner surfaces of said first passageway in opposition to one another, said spring members extending toward each other so as to close said outlet slot, said light-trapping members being attached to surfaces of said spring members.

23. A lens-fitted photographic film unit as defined in claim 21, further comprising:
 a V-shaped member attached to a first inside surface of said first passageway so as to extend across said outlet slot towards a second inside surface of said first passageway, said light-trapping members being attached to said spring member and said second inside surface of said first passageway, respectively.

24. A lens-fitted photographic film unit as defined in claim 23, further comprising:
a separator claw formed in said film take-up chamber so as to separate said film end from said exposed roll of said film wound up in said take-up chamber and to guide said film end to said outlet slot when said spool is rotated in said second direction.

25. A lens-fitted photographic film unit as defined in claim 24, further comprising:
a pair of ridges formed on a cylindrical surface of said film take-up chamber so as to contact with said exposed roll of said film wound in said take-up chamber in order to prevent said roll from loosening, said ridges causing rotation of said spool be transmitted to said exposed roll, a front edge of said film end abutting against said separator claw when said spool is rotated in said second direction.

26. A lens-fitted photographic film unit as defined in claim 24, further comprising:
a pair of projections formed on upper and lower surfaces of said film take-up chamber, said projections pressing said flanges of said spool toward each other so as to clamp a portion of said roll of said film wound on said spool, rotation of said spool being transmitted to said roll by virtue of contact between said flange and said roll, a front edge of said film end abuts upon said separator claw during rotation of said roll in said second direction.

27. A lens-fitted photographic film unit as defined in claim 24, said spool comprising:
a core;
a flange fitted on each end of said core, said flanges each having bearing holes formed therein, N recesses being formed, in a rotationally symmetrical disposition, in each of said flanges so as to communicate with said bearing holes;
N projections formed on each end of said core, each of said projections being received in a respective one of said recesses in order to prevent said flanges from rotating relative to said core; and
a pair of spring washers respectively disposed on upper and lower surfaces of said film take-up chamber so as to press said flanges together in order to clamp said exposed roll of said film between said flanges, said spring washers being adapted to transmitting rotation of said spool to said exposed roll by virtue of contact between said flanges and said exposed roll, a front edge of said film end abutting upon said separator claw during rotation of said exposed roll in said second direction.

28. A lens-fitted photographic film unit as defined in claim 2, said return preventing means comprising:
at least one guide portion projecting from a rear of said film take-up chamber, said guide portion having a contact surface in contact with said film, said contact surface directing said film end away from said entrance while said exposed roll of said film is rotated in said second direction in said film take-up chamber.

29. A lens-fitted photographic film unit as defined in claim 28, further comprising:
a rear cover disposed on a rear portion of said film unit for preventing light from entering a rear of said film supplying chamber and said film take-up chamber, said guide portion projecting from said rear cover.

30. A lens-fitted photographic film unit as defined in claim 29, wherein said outlet slot is situated on said rear cover of said film unit.

31. A method for advancing photographic film from a supply chamber of a film unit to a take-up chamber thereof and subsequently to an exterior of said film unit, said method comprising:
winding said film onto a spool which is rotatably disposed in said take-up chamber by rotating said spool in a first direction so as to cause said film to enter said take-up chamber through an entrance thereof;
at least partially obstructing said entrance after an entire length of said film has been wound in a roll around said spool;
rotating said roll in a second direction, which is opposite to said first direction, so as to cause a leading portion of said film to exit said take-up chamber through an exit slot formed in said film unit.

* * * * *